United States Patent
Razavi et al.

(10) Patent No.: US 7,301,040 B2
(45) Date of Patent: Nov. 27, 2007

(54) BIDENTATE CATALYST FOR OLEFIN POLYMERIZATION, METHODS OF FORMING SUCH AND PRODUCTS THEREFROM

(75) Inventors: Abbas Razavi, Mons (BE); Vladimir P. Marin, Houston, TX (US); Margarito Lopez, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 202 days.

(21) Appl. No.: 11/206,895

(22) Filed: Aug. 18, 2005

(65) Prior Publication Data

US 2007/0043184 A1   Feb. 22, 2007

(51) Int. Cl.
C07F 7/00 (2006.01)
C07F 7/28 (2006.01)
C07F 9/00 (2006.01)
C08F 4/64 (2006.01)
C08F 4/602 (2006.01)

(52) U.S. Cl. .......................... 556/32; 556/51; 556/42; 502/167; 502/103

(58) Field of Classification Search .............. 556/32, 556/51, 62, 42; 502/167, 103
See application file for complete search history.

(56) References Cited

U.S. PATENT DOCUMENTS 6,103,657 A   8/2000   Murray 6,787,624 B2   9/2004   Coates
2004/0043894 A1   3/2004   Lee
2004/0054150 A1   3/2004   Murray

FOREIGN PATENT DOCUMENTS

| WO | WO 99/01481 | 1/1999 |
| WO | WO 02/64644 | 2/2002 |
| WO | WO 2004/016627 | 2/2004 |
| WO | WO 2004/069881 | 8/2004 |

*Primary Examiner*—Caixia Lu
(74) *Attorney, Agent, or Firm*—Tenley R. Kruegar; Catherine P. Schmidt

(57) ABSTRACT

Bidentate catalyst systems and the methods or forming such are described herein. The catalyst systems generally are compounds having the general formula:

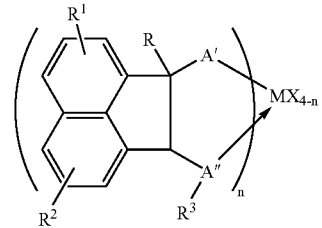

where R, $R^1$, $R^2$ and $R^3$ are optional and independently selected from hydrogen, $C_1$ to $C_{20}$ alkyl groups or $C_6$ to $C_{20}$ aryl groups, A' and A" are independently selected from coordination groups, M is a Group 4 or 5 transition metal, X is selected from halogens, alkyl groups, aromatic groups or combinations thereof and n is less than 4.

11 Claims, No Drawings

BIDENTATE CATALYST FOR OLEFIN POLYMERIZATION, METHODS OF FORMING SUCH AND PRODUCTS THEREFROM

FIELD

Embodiments of the present invention generally relate to polyolefin catalyst systems and, in particular, bidentate catalyst systems, methods of forming such catalyst systems and products formed from such catalyst systems, such as polyolefin polymers and polymer articles.

BACKGROUND

As reflected in the patent literature, a great deal of effort has been expended towards discovering improvements in polymerization processes. As such, a variety of metallocene and other single site catalysts have been developed to produce olefin polymers. However, problems such as catalyst activity and control over polymer morphology exist with many of the commercially available catalysts.

Therefore, a need exists to develop catalyst systems that are capable of producing polyolefins having predetermined properties, preferably with higher catalyst activity than currently experienced.

SUMMARY

Embodiments of the present invention generally include bidentate catalyst systems. The catalyst systems generally are compounds having the general formula;

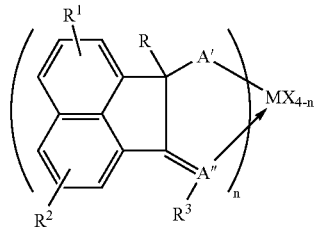

where R, $R^1$, $R^2$ and $R^3$ are optional and independently selected from hydrogen, $C_1$ to $C_{20}$ alkyl groups or $C_6$ to $C_{20}$ aryl groups; A' and A" are independently selected from coordination groups, M is a Group 4 or 5 transition metal, X is selected from halogens, alkyl groups, aromatic groups or combinations thereof and n is less than 4.

One embodiment includes a polyolefin polymerization process. The polymerization process generally includes providing the catalyst composition, activating the catalyst composition and contacting the catalyst composition with an olefin monomer to form a polyolefin composition.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology. Various terms as used herein are shown below. To the extent a term used in a claim is not defined below, it should be given the broadest definition persons in the pertinent art have given that term as reflected in printed publications and issued patents.

The term "bidentate" refers to compounds with two contiguous groups that are capable of binding or otherwise coordinating to a metal or metal oxide moiety.

The term "coordination group" refers to a structure including a central atom or molecule weakly connected to surrounding atoms or molecules.

The term "dative bond" refers to a covalent bond in which the electrons shared by two atoms are provided by only one of the two atoms.

The term "isotactic" refers to a polymer having methyl groups attached to the tertiary carbon of successive monomeric units on alternate sides of a hypothetical plane through the main chain of the polymer.

The term "olefin" refers to a hydrocarbon with a carbon-carbon double bond.

The term "room temperature" also referred to as "ambient" means that a temperature difference of a few degrees does not matter to the phenomenon under investigation, such as a preparation method. In some environments, room temperature may include a temperature of from about 21° C. to about 23° C. (68° F. to 72° F.) However, room temperature measurements generally do not include close monitoring of the temperature of the process and therefore such a recitation does not intend to bind the embodiments described herein to any predetermine temperature range.

The term "substituted" refers to an atom, radical or group that replaces another atom, radical or group in a chemical compound.

The term "syndiotactic" refers to a polymer having methyl groups attached to the tertiary carbon of successive monomeric units on alternate sides of a hypothetical plane through the main chain of the polymer.

Bidentate Catalyst System

The embodiments described herein generally include bidentate catalysts and catalyst systems.

Catalyst: The bidentate catalysts described herein are generally represented by the formula:

where L is a bidentate system, M is a Group 4 or 5 transition metal, X is a halogen or hydrocarbon group and n is less than 4. For example, n may be from 1 to 2.

In a specific embodiment, the bidentate catalyst is represented by the following formula:

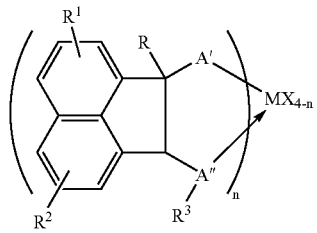

where R, R¹, R² and R³ are independently selected from hydrogen, $C_1$ to $C_{20}$ alkyl groups or $C_6$ to $C_{20}$ aryl groups, A' and A" are independently selected from coordination groups and may be substituted or unsubstituted, M is a Group 4 or 5 transition metal, X is a halogen, alkyl and/or aromatic group and n is less than 4. For example, n may be 1 or 2, for example. Further, A" is datively bonded to M.

Transition Metal (M): The metal atom "M" of the bidentate catalyst, as described throughout the specification and claims, may be selected from Groups 4 through 5 atoms in one embodiment, selected from Group 4 atoms in a more particular embodiment and selected from titanium (Ti), zirconium (Zr), vanadium (V) and hafnium (Hf) in yet a more particular embodiment. The groups bound the metal atom "M" are such that the compounds described in the formulas and structures below are electrically neutral, unless otherwise indicated.

Ligand (L): The ligand generally includes a bidentate system or a derivative thereof. The bidentate system forms at least one chemical bond with the metal atom "M" to form the "bidentate catalyst". The bidentate ligands are distinct from the leaving groups (X), described in further detail below, in that, at least, they are not highly susceptible to substitution/abstraction reactions.

In particular, the bidentate ligand typically includes one or more fused ring(s) or ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members.

The bidentate system substituent groups, e.g., R, R¹, R² and R³, may include hydrogen radicals, $C_1$ to $C_{20}$ hydrocarbons, such as alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl and dialkyl-carbamoyls, acyloxys, acylaminos, aroylaminos and combinations thereof. More particular non-limiting examples of alkyl substituents include methyl, ethyl, propyl, butyl, pentyl, hexyl, cyclopentyl, cyclohexyl, benzyl, phenyl, methylphenyl and tert-butylphenyl groups and the like, including all their isomers, such as tertiary-butyl, isopropyl and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like and halocarbyl-substituted organometalloid radicals including tris(trifluoromethyl)silyl, methylbis(difluoromethyl)silyl, bromomethyldimethylgermyl and the like, disubstituted boron radicals including dimethylboron for example, disubstituted Group 15 radicals including dimethylamine, dimethylphosphine, diphenylamine, methylphenylphosphine and Group 16 radicals including methoxy, ethoxy, propoxy, phenoxy, methylsulfide and ethylsulfide. Other substituents include olefins, such as, but not limited to, olefinically unsaturated substituents including vinyl-terminated ligands, for example 3-butenyl, 2-propenyl, 5-hexenyl and the like.

In a specific embodiment, R³ is a naphtha imino substituent group and in another specific embodiment, R³ is a pentaflouro imino substituent group.

In a specific embodiment, A' and A" are independently selected from oxygen and nitrogen. For example, A' and A" may be the same and both be oxygen, be the same and both be nitrogen or be different and A' be oxygen, while A" is nitrogen or vice versa. In one embodiment, A' is oxygen and A" is nitrogen.

Leaving Group (X): Each leaving group generally includes a benzyl containing leaving group. In one specific embodiment, the leaving group is $CH_2Ph$, for example. In another embodiment, the leaving group is a halogen, such as chlorine or bromine, for example.

Specific, non-limiting examples of bidentate catalyst systems are shown below for illustration purposes only:

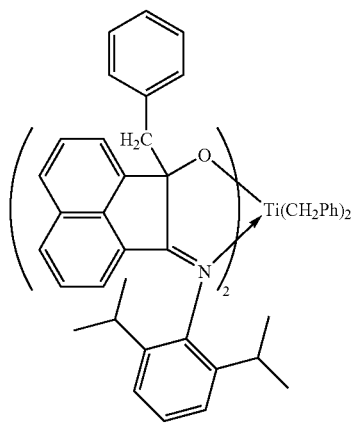

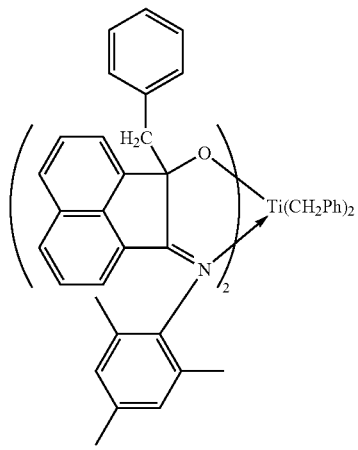

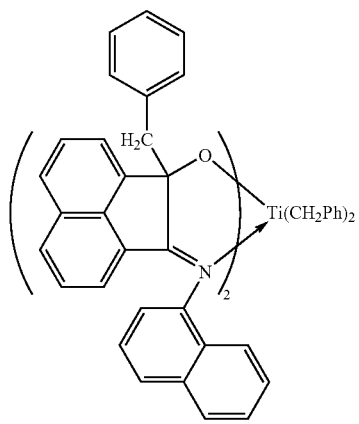

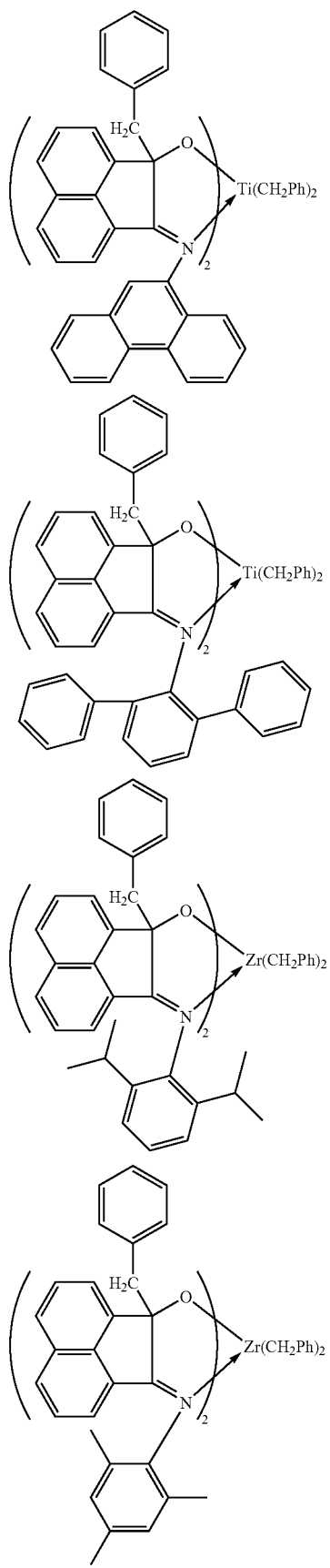
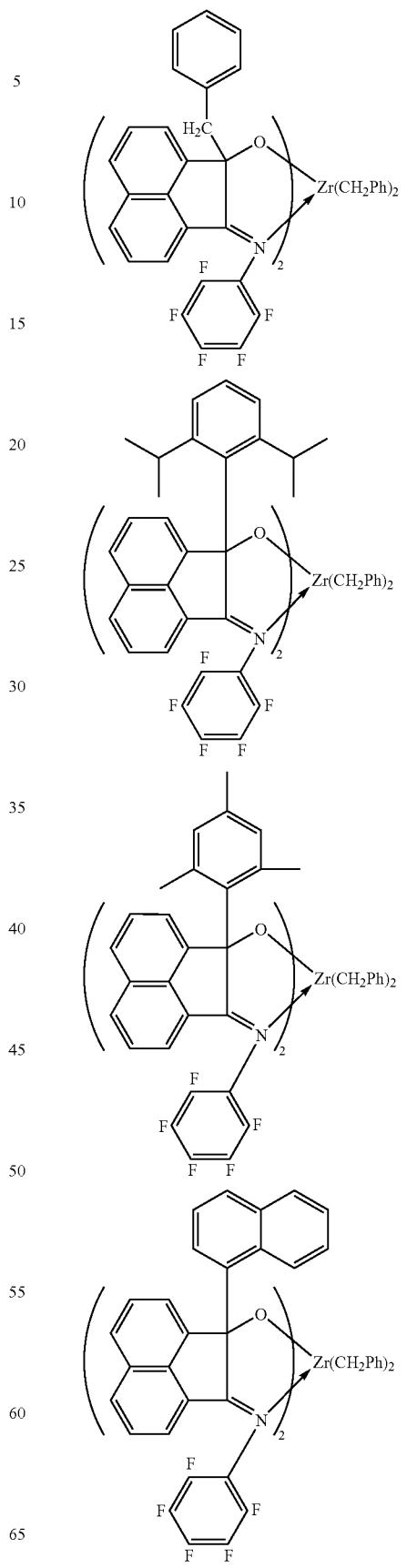

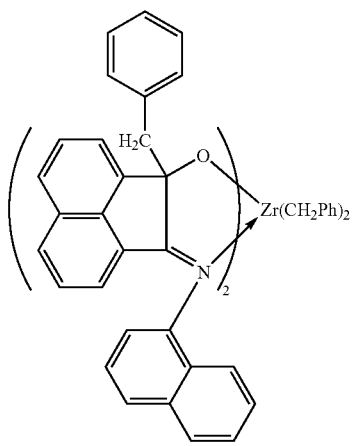
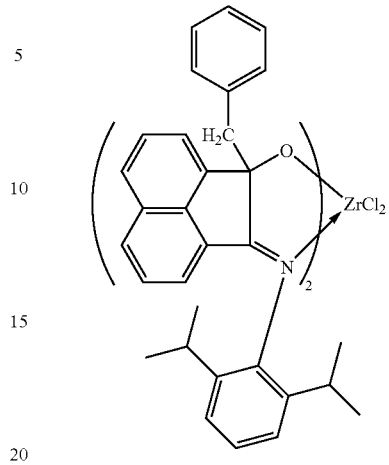
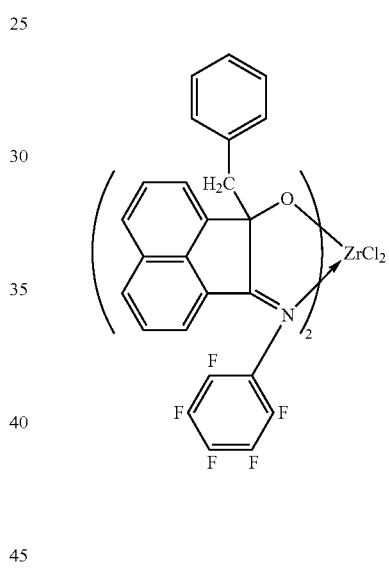
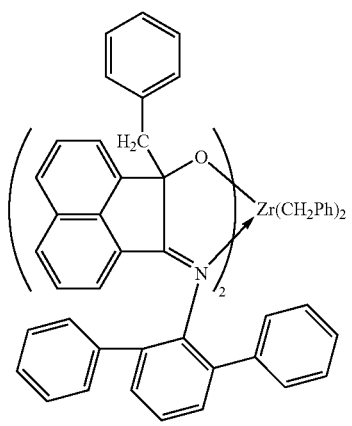
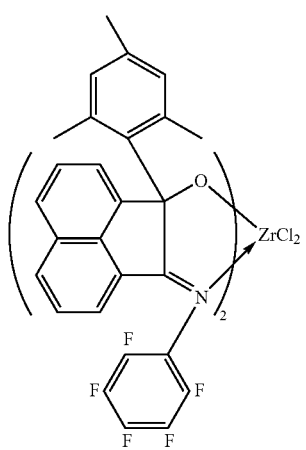

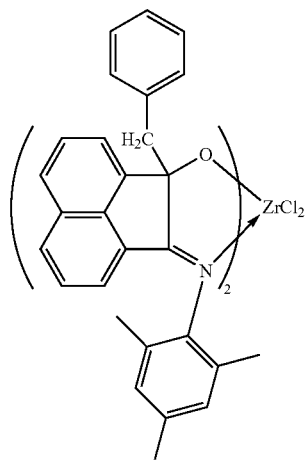
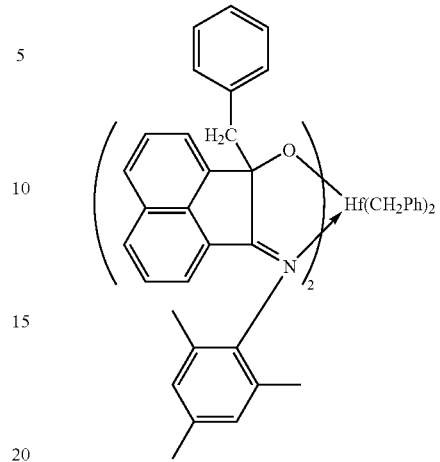
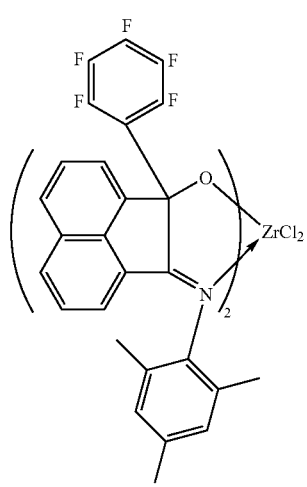
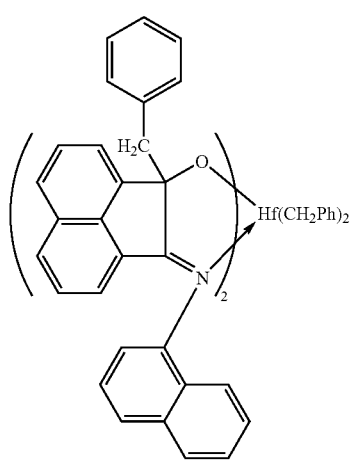
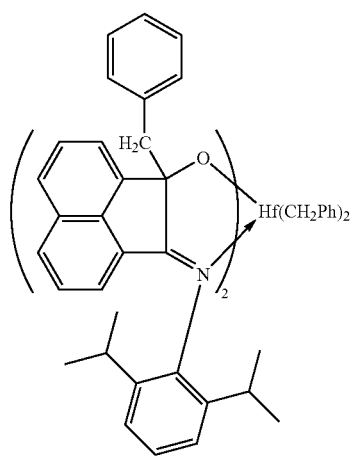
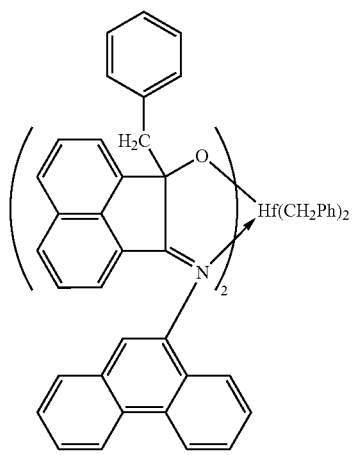

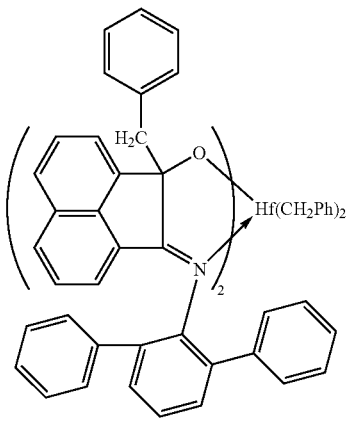

Catalyst Preparation: Desirable methods for preparing the bidentate catalyst may include any preparation method known to one skilled in the art capable of forming such catalyst compounds.

Generally, the catalyst preparation methods generally include first forming the bidentate ligands having the same general formula as the bidentate ligands described above.

In one specific embodiment, napththo-monoimine (O,N-Imine) ligands are synthesized from a condensation reaction of one equivalent of an amine with 1,2-acenaphthenedione in benzene/p-toluenylsulfonic acid. The ligands are then isolated in 50% to 7 90% yield and characterized by GC and $^1$H-NMR. In another embodiment, the bisimine (bis(N,N-Imine)) is isolated as a side product. See, illustration below.

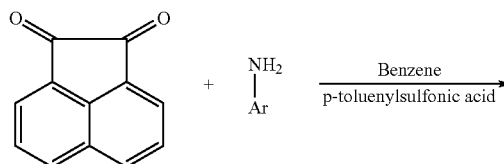

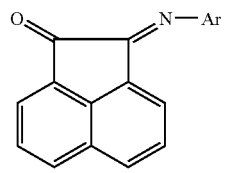

L1 = Ar = 2,6-$^i$PrC$_6$H$_3$
L2 = 2,3,4,5,6-F$_5$C$_6$
L3 = 2-methylnaphthyl
L4 = Phenanthrene In another embodiment, bidentate (OH,N-Imino) ligands are synthesized by the process illustrated below.

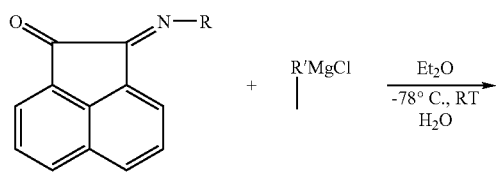

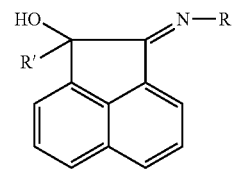

L5: R = 2,6-$^i$PrC$_6$H$_3$, R' = PhCH$_2$
L6: R = 2,3,4,5,6-F$_5$C$_6$, R' = PhCH$_2$
L7: R = 2,3,4,5,6-F$_5$C$_6$, R' = Mesityl The catalyst preparation then generally includes contacting the bidentate ligand with a reagent to form the bidentate catalyst.

The tetrabenzyl group 4 complexes may then be synthesized from the ligands described above according to the literature procedures described in *J. J. Felten and W. P. Anderson, J. Organomet. Chem.* 1972, 36, 87 and *U. Zucchini, E. Albizatti and U. Gianni, J. Organomet. Chem.*, 1971, 26, 357, illustrated below.

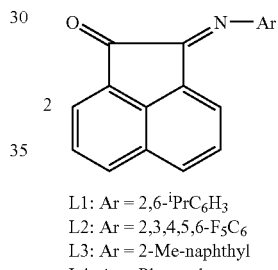

L1: Ar = 2,6-$^i$PrC$_6$H$_3$
L2: Ar = 2,3,4,5,6-F$_5$C$_6$
L3: Ar = 2-Me-naphthyl
L4: Ar = Phenanthrene

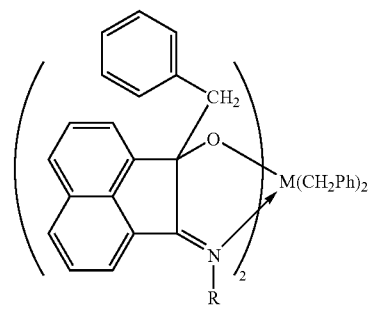

A: M = Ti, R = 2,6-$^i$PrC$_6$H$_3$
B: M = Zr, R = 2,6-$^i$PrC$_6$H$_3$
C: M = Zr, R = 2,3,4,5,6-F$_5$C$_6$
D: M = Zr, R = 2-methylnaphthyl
E: M = Zr, R = Phenanthrene
F: M = Hf, R = 2,6-$^i$PrC$_6$H$_3$ In another embodiment the naphtho-Group 4 complexes are synthesized by the methods illustrated below, for example.

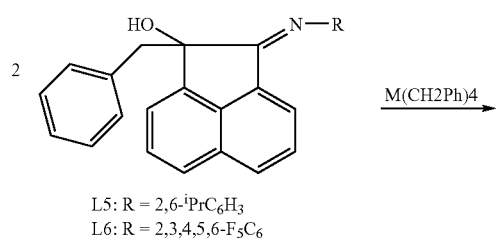

L5: R = 2,6-$^i$PrC$_6$H$_3$
L6: R = 2,3,4,5,6-F$_5$C$_6$

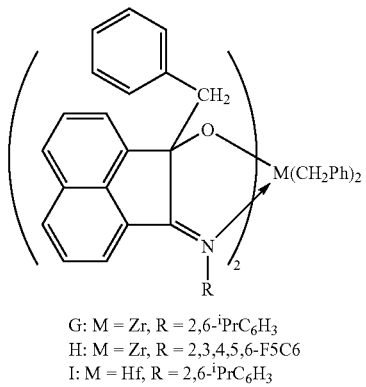

G: M = Zr, R = 2,6-$^i$PrC$_6$H$_3$
H: M = Zr, R = 2,3,4,5,6-F5C6
I: M = Hf, R = 2,6-$^i$PrC$_6$H$_3$

Another specific embodiment for forming catalysts from the naphtho-Group 4 complexes is illustrated below.

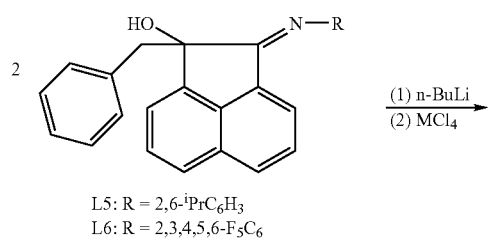

L5: R = 2,6-$^i$PrC$_6$H$_3$
L6: R = 2,3,4,5,6-F$_5$C$_6$

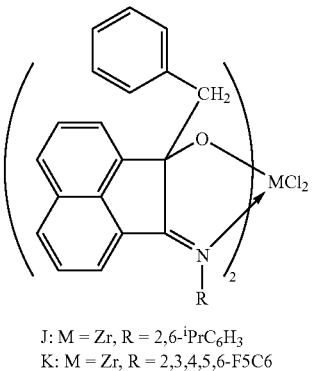

J: M = Zr, R = 2,6-$^i$PrC$_6$H$_3$
K: M = Zr, R = 2,3,4,5,6-F5C6

Yet another specific embodiment for forming the bidentate catalyst is illustrated below.

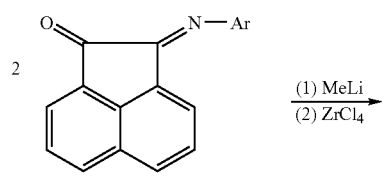

Ligand 1 = Ar = 2,6-$^i$PrC$_6$H$_3$

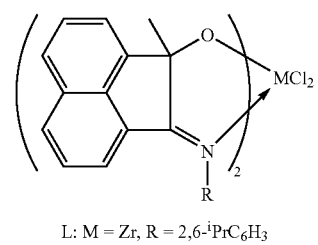

L: M = Zr, R = 2,6-$^i$PrC$_6$H$_3$

Yet another specific embodiment for forming the bidentate catalyst is illustrated below.

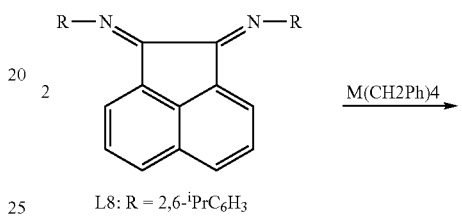

L8: R = 2,6-$^i$PrC$_6$H$_3$

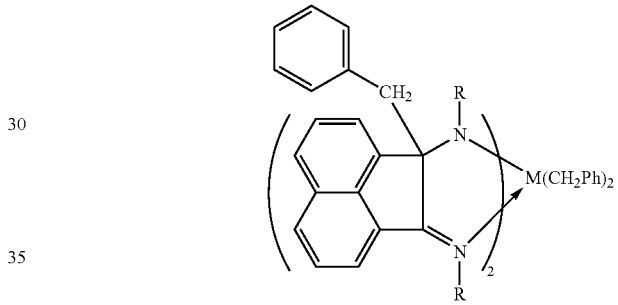

M: M = Hf, R = 2,6-$^i$PrC$_6$H$_3$

Although a number of catalyst preparation embodiments are illustrated above, additional methods of catalyst preparation may also be used. For example, in one embodiment, the catalyst preparation method includes contacting a bidentate system with a tetrabenzyl compound of a Group 4 or Group 5 metal to form the bidentate catalyst, e.g., direct benzylation of the C=O moiety of the bidentate system. In another method, the bidentate system is contacted with a chlorinated compound of a Group 4 or Group 5 metal, e.g., lithiation and metallization of the bidentate system, for example.

Activators: As used herein, the term "catalyst activator" is defined to be any compound or combination of compounds, supported or unsupported, which may activate a bidentate catalyst compound. Typically, this involves the abstraction of at least one leaving group (X group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators" or any other compound that may convert a neutral bidentate catalyst component to a bidentate cation that is active with respect to olefin polymerization.

More particularly, it is within the scope of this invention to use Lewis acids such as alumoxane (e.g., "MAO"), tetra-isobutyl alumoxane (e.g., "TIBAO"), modified alumuoxane (e.g, MMAO) and/or other alkylaluminum compounds as activators. Non-limiting examples of aluminum alkyl compounds which may be utilized as activators for the catalysts described herein include trimethylaluminum (TMA), triethylaluminum (TEAL), triisobutylaluminum, tri-n-hexylaluminum, tri-n-octylaluminum and the like, for example.

Ionizing activators are well known in the art and are described by, for example, *Eugene You-Xian Chen & Tobin J. Marks, Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds, and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, and alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls) and combinations thereof. In yet another embodiment, the three groups are selected from the group alkyls having 1 to 4 carbon groups, phenyl, naphthyl and mixtures thereof. In yet another embodiment, the three groups are selected from the group including highly halogenated alkyls having 1 to 4 carbon groups, highly halogenated phenyls, highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

Illustrative, not limiting examples of ionic ionizing activators include trialkyl-substituted ammonium salts such as triethylammoniumtetraphenylboron, tripropylammoniumtetraphenylboron, tri(n-butyl)ammoniumtetraphenylboron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron, tributylammoniumtetra(pentafluorophenyl)boron, tri(n-butyl)ammoniumtetra(o-tolyl)boron and the like, N,N-dialkylanilinium salts, such as N,N-dimethylaniliniumtetraphenylboron, N,N-diethylaniliniumtetraphenylboron, N,N-2,4,6-pentamethylaniliniumtetraphenylboron and the like, dialkyl ammonium salts, such as diisopropylammoniumtetrapentafluorophenylboron, dicyclohexylammoniumtetraphenylboron and the like, triaryl phosphonium salts, such as triphenylphosphoniumtetraphenylboron, trimethylphenylphosphoniumtetraphenylboron, tridimethylphenylphosphoniumtetraphenylboron and the like, and their aluminum equivalents, for example.

In yet another embodiment, an alkylaluminum may be used in conjunction with a heterocyclic compound. The ring of the heterocyclic compound may include at least one nitrogen, oxygen, and/or sulfur atom and includes at least one nitrogen atom in one embodiment. The heterocyclic compound includes 4 or more ring members in one embodiment and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example, a halogenated aryl group. In one embodiment the halogen is selected from chlorine, bromine and fluorine.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

In one embodiment, the heterocyclic compound described above is combined with an alkyl aluminum or an alumoxane to yield an activator compound which, upon reaction with a catalyst component, produces an active polymerization catalyst. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum and combinations thereof.

Other activators include those described in WO 98/07515 such as tris (2, 2',2"-nonafluorobiphenyl) fluoroaluminate, which is incorporated by reference herein. Combinations of activators are also contemplated by the invention, for example, alumoxanes and ionizing activators in combinations. Other activators include aluminum/boron complexes, perchlorates, periodates and iodates including their hydrates, lithium (2,2'-bisphenyl-ditrimethylsilicate)-4T-HF and sylium salts in combination with a non-coordinating compatible anion, for example. Also, methods of activation such as using radiation, electro-chemical oxidation and the like are also contemplated as activating methods for the purposes of rendering the neutral catalyst compound or precursor to a cation capable of polymerizing olefins. Other activators or methods for activating a catalyst compound are described in, for example, U.S. Pat. Nos. 5,849,852, 5,859,653 and 5,869, 723 and WO 98/32775.

In general, the activator and catalyst component(s) are combined in molar ratios of activator to catalyst component from 1000:1 to 0.1:1 in one embodiment, from 300:1 to 1:1 in a more particular embodiment, from 150:1 to 1:1 in yet a more particular embodiment, from 50:1 to 1:1 in yet a more particular embodiment, from 10:1 to 0.5:1 in yet a more particular embodiment and from 3:1 to 0.3:1 in yet a more particular embodiment, wherein a desirable range may include any combination of any upper molar ratio limit with any lower mole ratio limit described herein. When the activator is a cyclic or oligomeric poly(hydrocarbylaluminum oxide) (e.g., "MAO"), the molar ratio of activator to catalyst component may be from 2:1 to 100,000:1 in one embodiment, from 10:1 to 10,000:1 in another embodiment and from 50:1 to 2,000:1 in a more particular embodiment. When the activator is a neutral or ionic ionizing activator such as a boron alkyl and the ionic salt of a boron alkyl, the molar ratio of activator to catalyst component ranges from 0.5:1 to 10:1 in one embodiment and from 1:1 to 5:1 in yet a more particular embodiment.

More particularly, the molar ratio of Al/M metal (Al from MAO) may be from 40 to 500, or from 50 to 400, or from 60 to 300, or from 70 to 200, or from 80 to 175 or from 90 to 125, for example, wherein a desirable molar ratio of Al (e.g., MAO) to metallocene-metal "M" may be any combination of any upper limit with any lower limit described herein.

Support: The activators may or may not be associated with or bound to a support, either in association with the catalyst component or separate from the catalyst component, such as described by Gregory G. Hlatky, *Heterogeneous Single-Site Catalysts for Olefin Polymerization* 100(4) CHEMICAL REVIEWS 1347-1374 (2000). Such choice of support may be made depending on the necessity of control of polymer morphology and molecular weight, for example.

The bidentate catalyst may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include silica, alumina, magnesia, titania and zirconia, for example. The inorganic oxides used as support materials may have an average particle size of from 30 microns to 600 microns or from 30 microns to 100 microns, for example, a surface area from 50 m$^2$/g to 1,000 m$^2$/g or from 100 m$^2$/g to 400 m$^2$/g, for example, and a pore volume of from 0.5 cc/g to 3.5 cc/g or from 0.5 cc/g to 2 cc/g, for example.

Desirable methods for supporting catalysts are described in U.S. Pat. Nos. 5,643,847 and 09/184,389, which are incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

Polymerization Processes

As indicated elsewhere herein, catalyst systems are used to make polyolefin compositions. Once the catalyst system is prepared, as described above and/or as known to one skilled in the art, a variety of processes can be carried out using that composition. Among the varying approaches that can be used include procedures set forth in U.S. Pat. No. 5,525,678, incorporated by reference herein. The equipment, process conditions, reactants, additives and other materials will of course vary in a given process, depending on the desired composition and properties of the polymer being formed. For example, the processes of U.S. Pat. No. 6,420,580, U.S. Pat. No. 6,380,328, U.S. Pat. No. 6,359,072, U.S. Pat. No. 6,346,586, U.S. Pat. No. 6,340,730, U.S. Pat. No. 6,339,134, U.S. Pat. No. 6,300,436, U.S. Pat. No. 6,274,684, U.S. Pat. No. 6,271,323, U.S. Pat. No. 6,248,845, U.S. Pat. No. 6,245,868, U.S. Pat. No. 6,245,705, U.S. Pat. No. 6,242,545, U.S. Pat. No. 6,211,105, U.S. Pat. No. 6,207,606, U.S. Pat. No. 6,180,735 and U.S. Pat. No. 6,147,173 may be used and are incorporated by reference herein.

The catalyst systems described above can be used in a variety of polymerization processes, over a wide range of temperatures and pressures. The temperatures may be in the range of from about −60° C. to about 280° C., or from about 50° C. to about 200° C. and the pressures employed may be in the range of from 1 atmosphere to about 500 atmospheres or higher.

Polymerization processes may include solution, gas phase, slurry phase, high pressure processes or a combination thereof.

In certain embodiments, the process of the invention is directed toward a solution, high pressure, slurry or gas phase polymerization process of one or more olefin monomers having from 2 to 30 carbon atoms, or from 2 to 12 carbon atoms or from 2 to 8 carbon atoms, such as ethylene, propylene, butane, pentene, methylpentene, hexane, octane and decane. Other monomers include ethylenically unsaturated monomers, diolefins having from 4 to 18 carbon atoms, conjugated or nonconjugated dienes, polyenes, vinyl monomers and cyclic olefins. Non-limiting monomers may include norbornene, nobornadiene, isobutylene, isoprene, vinylbenzocyclobutane, styrenes, alkyl substituted styrene, ethylidene norbornene, dicyclopentadiene, and cyclopentene. In one embodiment, a copolymer is produced, such as propylene/ethylene, or a terpolymer is produced. Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. No. 4,543,399, U.S. Pat. No. 4,588,790, U.S. Pat. No. 5,028,670, U.S. Pat. No. 5,317,036, U.S. Pat. No. 5,352,749, U.S. Pat. No. 5,405,922, U.S. Pat. No. 5,436,304, U.S. Pat. No. 5,456,471, U.S. Pat. No. 5,462,999, U.S. Pat. No. 5,616,661 and U.S. Pat. No. 5,668,228, which are incorporated by reference herein.)

The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C. Other gas phase processes contemplated by the process includes those described in U.S. Pat. No. 5,627,242, U.S. Pat. No. 5,665,818 and U.S. Pat. No. 5,677,375, which are incorporated by reference herein.

Slurry processes generally include forming a suspension of solid, particulate polymer in a liquid polymerization medium, to which monomers and optionally hydrogen, along with catalyst, are added. The suspension (which may include diluents) can be intermittently or continuously removed from the reactor where the volatile components can be separated from the polymer and recycled, optionally after a distillation, to the reactor. The liquefied diluent employed in the polymerization medium is typically an alkane having from 3 to 7 carbon atoms, such as a branched alkane. The medium employed is generally liquid under the conditions of polymerization and relatively inert, duch as hexane or isobutene.

In a specific embodiment, a slurry process or a bulk process (e.g., a process without a diluent) may be carried out continuously in one or more loop reactors. The catalyst, as a slurry or as a dry free flowing powder, can be injected regularly to the reactor loop, which can itself be filled with circulating slurry of growing polymer particles in a diluent. Hydrogen, optionally, may be added as a molecular weight control. The reactor may be maintained at a pressure of from about 27 bar to about 45 bar and a temperature of from about 38° C. to about 121° C., for example. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence form removal of the diluent and all unreacted monomer and comonomers. The resulting hydrocarbon free powder can then be compounded for use in various applications. Alternatively, other types of slurry polymerization processes can be used, such stirred reactors is series, parallel or combinations thereof.

Polymer Product

The polymers produced by the processes described herein can be used in a wide variety of products and end-use applications. The polymers include linear low density polyethylene, elastomers, plastomers, high density polyethylene, low density polyethylene, medium density polyethylene, polypropylene and polypropylene copolymers. In certain embodiments, propylene based polymers can be produced using the processes described herein. These polymers include atactic polypropylene, isotactic polypropylene or blends thereof, for example. Other propylene polymers include propylene block or impact copolymers. In one specific embodiment, the polymer includes highly crystalline isotactic polypropylene.

In one embodiment, the polymer is a propylene homopolymer having a crystallinity measured by $^{13}C$ NMR spectroscopy using meso pentads (e.g., % mmmm) of greater than about 20%, or greater than about 70%, or greater than about 80% or greater than about 84%, or from about 10% to about 90% for example.

In one embodiment, the polypropylene is highly isotactic (e.g., % mmmm of from about 60% to about 80%) and has a melting point ($T_m$) of from about 130° C. to about 165° C. Such polymer further has a molecular weight (Mw) of from about 2,000 to about 1,000,000, for example. In one embodiment, the polymer may have a molecular weight of from about 100,000 to about 800,000, for example.

In one embodiment, the polypropylene exhibits low tacticity, e.g., % mmmm of from about 10% to about 60%. It has unexpectedly been observed that the tacticity can be controlled through the selection of R and $R^3$. Further, it is believed that different enantiomers of the polymers described above have an impact on the isotacticity of the polypropylene.

Unimodal or multimodal, e.g., bimodal and/or trimodal, molecular weight distribution may be observed utilizing the embodiments described herein. Such molecular weight distributions may result in Mw/Mn of from about 2 to about 10, for example.

Unexpectedly, it has been observed that the molecular weight of the polyethylene may be controlled by the monomer concentration, the choice of imino group in the bidentate catalyst, the metal in the bidentate catalyst or combinations thereof. Such variations may result in a polymer Mw of from about 1,000 to an Ultra High Molecular Weight (UHMW) polymer. Such polymer can further have a Mw/Mn of from about 2 to about 20.

In one embodiment the polymers described above are copolymers. For example, the polymer could be a copolymer of ethylene and butane or hexene, for example. In another embodiment, the polymer is a copolymer of propylene and ethylene, for example.

The polymers may be blended and/or coextruded with any other polymer. Non-limiting examples of other polymers include linear low density polyethylenes produced via conventional Ziegler-Natta and/or metallocene type catalysts, elastomers, plastomers, low density polyethylene, high density polyethylene and polypropylene, for example.

Product Application

Polymers produced by the processes described herein and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geo-textiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

EXAMPLES

General: Selected synthesis products were characterized by $^1H$-NMR using a Varian VXR 300S NMR Spectrometer. The polymers molecular weights and molecular weight distributions were analyzed by GPC Waters-Model Alliance GPC 2000 (Refractive Index Detector) Chromatograph at 140° C. with 1,2,4-trichlorobenzene solvent and polystyrene calibration standards. The melting temperatures were analyzed by differential scanning calorimetry. The tacticity of the polypropylene was obtained by $^{13}C$-NMR using a Varian VXR 500S NMR Spectrometer. The polypropylene samples were dissolved in 1,2,4-Trichlorobenzene and tested at 120° C.

Ligand Synthesis: Specific ligands, L1-L4 and L8 were synthesized and analyzed as follows.

L1, e.g., 1-(2,6-diisopropyl-1-phenylimino)-2-acenaphthenenone, illustrated below, was synthesized by adding 2,6-diisopropylaniline (1.00 g, 5.67 mmol) to a stirred slurry of 1,2-acenaphthenedione (1.00 g, 5.48 mmol) in benzene (30 mL). A catalytic amount of p-toluenesulfonic acid was then added to the resulting slurry and the reaction mixture was refluxed. The water formed was separated via a Dean-Stark trap. The reaction was refluxed for 2 hours and then left to stand overnight under argon. The reaction mixture was then filtered and recrystallized from toluene. The monoimine (L1) was obtained as a dark orange solid (53% isolated product).

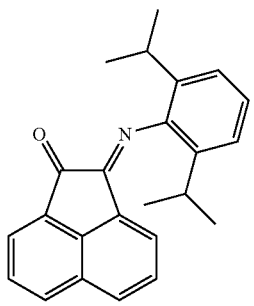

$^1$H-NMR (300 MHz, $C_6D_6$) δ: 7.80 (d,J=6.9 Hz, 1$H_{arom}$), 7.42 (d,J=8.1 Hz, 2$H_{arom}$), 7.32-7.07(m, $H_{arom}$), 6.79 (d, 2$H_{arom}$), 3.01 (q, 2H, CH), 1.15 (d,J=6.9 Hz, 12H, iPr), 0.913 (d,J=6.6 Hz, 12H, iPr).

L2, e.g., 1-(2,3,4,5,6-pentafluoro-1-phenylimino)-2-acenaphthenenone, illustrated below, was synthesized by adding a solution of 2,3,4,5,6-pentafluoroaniline (0.50 g, 2.74 mmol) in benzene (20 mL) to a stirred slurry of 1,2-acenaphthenedione (0.50 g, 2.74 mmol) in benzene (90 mL). A catalytic amount of p-toluenesulfonic acid was then added to the resulting slurry and the reaction mixture was then refluxed. The water formed was separated via a Dean-Stark trap. The reaction was refluxed for 2 hours and then left to stand overnight under argon. The reaction mixture was obtained as a deep green/brown solution, which contained about 84% of the desired monoimine by G.C. analysis.

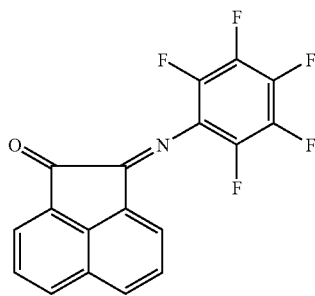

L3, e.g., 1-(2-methyl-1-naphthylimino)-2-acenaphthenenone, illustrated below, was synthesized by adding 2-Methylnaphthylamine (0.43 g, 2.74 mmol) to a stirred slurry of 1,2-acenaphthenedione (0.50 g, 2.74 mmol) in benzene (90 mL). A catalytic amount of p-toluenesulfonic acid was added to the resulting slurry and the reaction mixture was then refluxed. The water formed was separated via a Dean-Stark trap. The reaction was refluxed for 2 hours and then left to stand overnight under argon. The reaction mixture was obtained as a deep green/brown solution which contained about 20% of the bisimine and 80% of the desired monoimine by G.C. analysis.

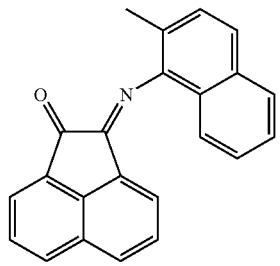

L4, e.g., 1-(9-phenanthreneimino)-2-acenaphthenenone, illustrated below, was prepared by adding a solution of 9-aminophenanthrene (0.26 g, 1.37 mmol) to a stirred slurry of 1,2-acenaphthenedione (0.50 g, 2.74 mmol) in benzene (90 mL). A catalytic amount of p-toluenesulfonic acid was added to the resulting slurry and the reaction mixture was then refluxed. The water formed was separated via a Dean-Stark trap. The reaction was refluxed for 2 hours and then left to stand overnight under argon. The solvent was removed by rotavap and the remaining solids were recrystallized from methanol. A solid was obtained that contained 74% of the desired monoimine and 26% of 1,2-acenaphthenedione by G.C. analysis.

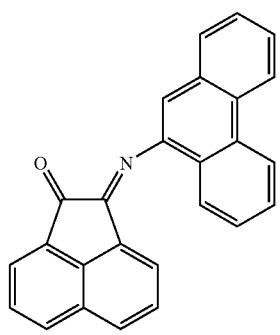

L8, e.g., 1,2-bis-(2,6-diisopropylphenylimino)-acenaphthene, shown below, was prepared simultaneously as L1 and was isolated as a side product as dark orange/yellow crystals (18% isolated product). L8 was then characterized by GC and 1H-NMR.

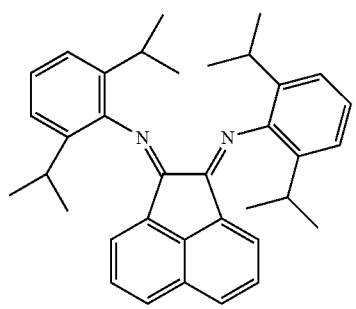

L5 was prepared by adding PhCH$_2$MgCl (3.13 mL, 3.13 mmol, 1M solution in diethyl ether, commercially available from Aldrich Chemicals) to a solution of 1-[(2,6-diisopropyphenylimino)-ethyl]-2-acenaphthenenone (1.04 g, 3.04 mmol) in diethyl ether (30 mL) over 5 minutes at −78° C. After warming the resultant mixture to ambient temperature, the reaction mixture was stirred for 16 hours. The reaction mixture was then quenched in slightly acidic ice water and extracted with diethyl ether. The extract was dried over $MgSO_4$, filtered and recovered via rotavap. The resulting ligand, L5, was then isolated by column chromatography (ethyl acetate/hexane (1:4)) resulting in a yield of 0.45 grams (33% yield). The analysis results were as follows: $^1$H-NMR (300 MHz, $CD_2Cl_2$) δ: 7.92 (d, J=8.1 Hz, $1H_{arom}$), 7.84 (d, 1H, J=8.4 Hz, Ar), 7.53 (t, 1H, Ar), 7.40-7.25 (m, Ar), 6.93 (d, 1H, J=6.9 Hz, Ar), 6.59 (d, 1H, J=7.2 Hz, Ar,), 3.79 (d, 1H, J=13.8 Hz, $CH_2Ph$), 3.31(s, 1H, OH), 3.11 (d, 1H, J=13.5 Hz, $CH_2Ph$), 3.12 (q, 1H, CH, iPr), 2.82 (q, 1H, CH, iPr), 1.30 (d, 3H, J=6.6 Hz, ,iPr) 1.18 (d, 3H, J=6.9 Hz, iPr), 1.11 (d, 3H, J=6.9 Hz, iPr), 0.82 (d, 3H, J=6.9 Hz, iPr).

L6 was prepared by adding $PhCH_2MgCl$ (5.87 mL, 5.87 mmol, 1M solution in diethyl ether, commercially available from Aldrich Chemicals) to a slurry of ligand L2 (2.0 g, 5.75 mmol) in diethyl ether (20 mL) over 5 minutes at −78° C. After warming the resultant mixture up to ambient temperature, the reaction mixture was stirred for 5 hours. The reaction mixture was then quenched in slightly acidic ice water and extracted with diethyl ether. The extract was dried over $MgSO_4$, filtered and extracted via rotavap resulting in a yield of 1.58 grams (67% yield). The analysis results were as follows: $^1$H-NMR (300 MHz, $CD_2Cl_2$) δ: 8.00 (d, 1H, J=8.4 Hz, Ar), 7.89 (d, 1H, J=8.4 Hz, Ar), 7.71 (t, 1H, Ar), 7.50-7.47 (m,Ar), 7.12-7.02 (m,Ar), 3.62 (d, 1H, J=13.2 Hz, $CH_2Ph$), 3.45 (d, 1H, J=13.5 Hz, $CH_2Ph$), 2.64 (s, 1H, OH).

L7 was prepared by adding MesitylMgBr (1.72 mL, 1.72 mmol) to a slurry of ligand L2 (0.5 g, 1.48 mmol) in diethyl ether (20 mL) over 5 minutes at −78° C. After warming the resulting mixture up to ambient temperature, the reaction mixture was stirred for 16 hours. The reaction mixture was then quenched in slightly acidic ice water and extracted with diethyl ether. The extract was dried over $MgSO_4$, filtered and the solvent removed by rotavap. The residue was washed with hexane and yielded 0.37 grams (54% yield) of the desired ligand. The analysis results were as follows: $^1$H-NMR (500 MHz, benzene-$d_6$) δ: 8.11 (d, 1H, J=7.5 Hz, Ar), 7.60 (d, 1H, J=8.5 Hz, Ar), 7.56 (d, 1H, J=8.5 Hz,Ar), 7.44 (d, 1H, J=8.00 Hz,Ar), 7.31 (t, 1H, J=7.5 Hz, Ar), 7.18-7.00 (m, Ar), 6.82 (d, 1H, J=6.50 Hz,Ar), 6.54 (s, 1H, Ar), 6.46 (s, 1H, Ar), 2.50 (s, 3H, CH3), 2.00 (s, Ar), 1.69 (s, 1H, OH), 1.69 (s, 3H, CH3), 1.42 (s, 3H, CH3).

Synthesis of Catalyst Compounds: Catalyst A was prepared by adding monoimine ligand L1 (100 mg, 292 μmol) and $Ti(CH_2Ph)_4$ (60 mg, 146 μmol) to a 10 mL Wheaton vial (in a glove box) that was equipped with a magnetic stirrer. Benzene-$d_6$ (5 mL) was then added to the vial and immediately the reaction mixture turned to a dark brown solution. The vial was then capped with a mininert Teflon valve, covered with aluminum foil and left to stir at room temperature. An aliquot of 0.2 mL was sampled after 2 hours for ethylene polymerization test, discussed in further detail below. The rest of the reaction was left to stir at room temperature overnight.

Catalyst B was prepared by charging a 25 mL schleck-type flask (in a glove box) with the monoimine ligand L1 (150 mg, 0.438 mmol) and the $Zr(CH_2Ph)_4$ (100 mg, 0.219 mmol). The solids were immediately dissolved in toluene (15 mL) producing a deep purple/brown solution. The flask was then covered with aluminum foil and stirred at room temperature. After 1 hour, an aliquot (0.2 mL, 5 mg) of the reaction mixture was used for ethylene polymerization. The rest of the reaction mixture was left to stir for 4 days. After removal of the solvent by vacuum, a deep purple crystalline solid was obtained in quantitative yield. Analysis of the sample was as follows: $^1$H-NMR (300 MHz, $C_6D_6$) δ: 7.43-7.29 (m, $H_{arom}$), 7.09-6.89 (m, $H_{arom}$), 6.83 (d, J=7.2 Hz, $H_{arom}$), 6.74 (t, J=7.8 Hz, $H_{arom}$), 6.35 (t, J=6.9 Hz, $H_{arom}$), 5.07 (d, J=12.6 Hz, 1H, $CH_2Ph$), 4.53 (d, J=12.9 Hz, 1H, $CH_2Ph$), 4.03 (q, 2H, CH), 2.58 (q, 2H, CH), 1.36 (d, J=6.3 Hz, 3H), 0.42 (d, J=6.3 Hz, 3H), 0.32 (d, J=6.6 Hz, 3H), 0.17 (d, J=6.6 Hz, 3H).

Catalyst B was then supported by mixing 0.50 g of MAO/$SiO_2$ G-952 slurried in 10 mL of toluene and then slowly adding 20 mg (in 0.83 mL of toluene) of catalyst B at 20° C. After stirring for 1 hour, the solids were allowed to settle. The supernatant (clear, colorless) was then removed by cannula and washed 3 times with 10 mL of hexane. The solids were dried by vacuum at room temperature. A green/brown powder (0.473 grams) was obtained. The catalyst was slurried in 15.98 grams of mineral oil and used for ethylene polymerizations.

Catalyst C was prepared by charging a schleck-type tube with the monoimine ligand L2 (101.4 mg, 292.0 μmol) and the $Zr(CH_2Ph)_4$ (61.5 mg, 134.9 μmol). The solids were immediately dissolved in benzene-$d_6$ (5 mL) producing a red/brown solution. After stirring overnight, an aliquot (0.3 mL) of the reaction mixture was used for ethylene polymerization.

Catalyst D was prepared by charging a schleck-type tube with the monoimine ligand L3 (62.9 mg, 195.7 μmol) and the $Zr(CH_2Ph)_4$ (44.5 mg, 97.6 μmol). The solids were immediately dissolved in toluene (4 mL) producing a red/brown solution. After 1.5 hours, an aliquot (0.2 mL) of the reaction mixture was used for ethylene polymerization. The rest of the reaction mixture was left to stir overnight.

Catalyst E was prepared by charging a 20 mL Wheaton vial equipped with a magnetic stirrer with the monoimine ligand L4 (62.9 mg, 195.7 μmol) and the $Zr(CH_2Ph)_4$ (44.5 mg, 97.6 μmol). The solids were immediately dissolved in toluene (4 mL) producing a red/brown solution. After 1.5 hours, an aliquot (0.5 mL) of the reaction mixture was used for ethylene polymerization. The rest of the reaction mixture was left to stir overnight.

Catalyst F was prepared by charging a schleck-type tube (in a glove box) with the monoimine ligand L1 (54 mg, 158 μmol) and the $Hf(CH_2Ph)_4$ (43 mg, 79 μmol). The solids were immediately dissolved in toluene (5 mL) producing a brown solution. The flask was covered with aluminum foil and stirred at room temperature overnight. A brown solution was obtained. After removal of the solvent by vacuum, a deep purple crystalline solid was obtained in quantitative yield. The analysis results were as follows: $^1$H-NMR (300 MHz, $C_6D_6$) δ: 7.41 (d, J=8.1 Hz, $H_{arom}$), 7.33 (t, $H_{arom}$), 7.13-6.82 (m, $H_{arom}$), 6.73 (t, $H_{arom}$), 0.42 (d, J=6.3 Hz, J=7.2 Hz, $H_{arom}$), 5.01 (d, J=12.6 Hz, 1H, $CH_2Ph$), 4.56 (d, J=12.9 Hz, 1H, $CH_2Ph$), 4.05-4.02 (m, 2H, CH), 2.57 (q, 2H, CH), 1.36 (d, J=6.6 Hz, 3H), 0.44 (d, J=6.3 Hz, 3H), 0.32 (d, J=6.9 Hz, 3H), 0.17 (d, J=6.6 Hz, 3H).

Catalyst G was prepared by adding ligand L5 (52.5 mg, 0.11 mmol) in 0.90 mL C6D6 to a solution of $Zr(CH_2Ph)_4$ (100 mg, 0.23 mmol) in 0.80 mL $C_6D_6$ at ambient temperature over 5 minutes. The reaction mixture was left to stir away from light. Analysis of the Catalyst was as follows: $^1$H-NMR of the crude product after stirring overnight (300 MHz, $C_6D_6$) δ: 7.58-6.626.56 (m, Ar), 6.49 (d, 1H, J=6.6 Hz, Ar), 6.42 (d, 1H, J=7.2 Hz, Ar), 6.13 (d, 1H, J=7.2 Hz, Ar), 4.02 (q, 1H, CH, iPr), 3.84 (d, J=13.2 Hz, $CH_2Ph$), 3.65 (q, 1H, CH, iPr), 3.58 (d, J=13.2 Hz, $CH_2Ph$), 3.53 (d, J=12.9 Hz, $CH_2Ph$), 3.41 (d, J=12.6 Hz, $C_2Ph$), 2.99 (q, 1H, CH, iPr), 2.73 (d, J=10.2 Hz, CH$_2$Ph), 2.67 (d, J=12.9 Hz, CH$_2$Ph), 2.53 (d, J=10.8 Hz, CH$_2$Ph), 2.44 (d, J=10.5 Hz, CH$_2$Ph), 2.36 (d, J=10.5 Hz, CH$_2$Ph), 2.05 (d, J=11.1 Hz, CH$_2$Ph), 1.86 (d, J=9.0 Hz, CH$_2$Ph), 1.55 (d, 3H, J=6.6 Hz, , iPr), 1.42 (d, 3H, J=6.6 Hz, iPr), 1.26 (d, 3H, J=6.6 Hz, iPr), 1.15 (t, 3H, iPr), 0.30 (d, 3H, J=6.6 Hz, iPr), −0.01 (d, 3H, J=6.6 Hz, iPr).

Catalyst H was prepared by adding ligand L6 (52.5 mg, 0.11 mmol) in 0.90 mL C6D6 to a solution of Zr(CH$_2$Ph)$_4$ (100 mg, 0.23 mmol) in 0.80 mL C6D6 at ambient temperature over 5 minutes. The reaction mixture was left to stir away from light. The analysis of the catalyst was as follows: $^1$H-NMR after stirring overnight (300 MHz, C6D6) □: 8.33 (d, J=6.6 Hz, Ar), 7.83 (d, J=7.5 Hz, Ar), 7.52-6.60 (m, Ar), 6.50 (d, J=7.2 Hz, Ar), 6.23 (d, J=7.2 Hz, Ar), 4.36 (d, J=12.0 Hz, CH$_2$Ph), 3.90 (d, J=10.2 Hz, CH$_2$Ph), 3.79 (d, J=12.9 Hz, CH$_2$Ph), 3.54 (d, J=11.7 Hz, CH$_2$Ph), 3.50 (d, J=13.5 Hz, CH$_2$Ph), 3.46 (d, J=11.4 Hz, CH$_2$Ph), 3.31 (d, J=12.9 Hz, CH$_2$Ph), 3.05 (d, J=13.2 Hz, CH$_2$Ph).

Catalyst I was prepared by dissolving Hf(CH$_2$Ph)$_4$ (59.1 mg, 0.109 mmol) and the ligand L5 (94.5 mg, 0.218 mmol) in 4 mL C$_6$D$_6$ at ambient temperature. The reaction mixture was left to stir away from light overnight. Analysis of the resulting catalyst was as follows: $^1$H-NMR after stirring overnight (300 MHz, C$_6$D$_6$) 7.58-6.626.56 (m, Ar), 6.49 (d, 1H, J=6.6 Hz, Ar), 6.42 (d, 1H, J=7.2 Hz, Ar), 6.13 (d, 1H, J=7.2 Hz, Ar), 4.02 (q, 1H, CH, iPr), 3.84 (d, J=13.2 Hz, CH$_2$Ph), 3.65 (q, 1H, CH, iPr), 3.58 (d, J=13.2 Hz, CH$_2$Ph), 3.53 (d, J=12.9 Hz, CH$_2$Ph), 3.41 (d, J=12.6 Hz, CH$_2$Ph), 2.99 (q, 1H, CH, iPr), 2.73 (d, J=10.2 Hz, CH$_2$Ph), 2.67 (d, J=12.9 Hz, CH$_2$Ph), 2.53 (d, J=10.8 Hz, CH$_2$Ph), 2.44 (d, J=10.5 Hz, CH$_2$Ph), 2.36 (d, J=10.5 Hz, CH$_2$Ph), 2.05 (d, J=11.1 Hz, CH$_2$Ph), 1.86 (d, J=9.0 Hz, CH$_2$Ph), 1.55 (d, 3H, J=6.6 Hz, iPr), 1.42 (d, 3H, J=6.6 Hz, iPr), 1.26 (d, 3H, J=6.6 Hz, iPr), 1.15 (t, 3H, iPr), 0.30 (d, 3H, J=6.6 Hz, iPr), −0.01 (d, 3H, J=6.6 Hz, iPr).

Catalyst J was prepared by adding MeLi (0.36 mL, 0.576 mmol) to a stirred solution of ligand L5 (0.245 g, 0.565 mmol) in Et$_2$O (15 mL) at −78° C. over a 5 min. period. After warming the resulting mixture up to ambient temperature and stirring for 4 hours, ZrCl$_4$ (67.8 mg, 0.290 mmol) at −78° C. was then added to the mixture over 15 minutes. The reaction mixture was then allowed to warm up to room temperature (25° C.) and stirred under argon overnight. After removal of the solvent by vacuum, the solids were slurried in methylene chloride and filtered. The solvent was then removed from the filtrate and the solids were dried by vacuum. The complex obtained was a crystalline yellow/brown solid. Analysis of the resulting catalyst was as follows: $^1$H-NMR (300 MHz, CD$_2$Cl$_2$) δ: 7.82 (d, 1H, J=8.4 Hz, Ar), 7.51 (t, 1H, Ar), 7.33-7.20 (m, Ar), 6.90 (d, 1H, J=6.6 Hz, Ar), 6.56 (d, 1H, J=6.6 Hz, Ar), 3.12 (d, J=10.5 Hz, CH$_2$Ph), 3.04 (d, J=13.5 Hz, CH$_2$Ph), 3.03 (q, 1H, CH, iPr), 2.81 (q, 1H, CH, iPr), 1.28 (d, 3H, J=6.3 Hz, , iPr), 1.16 (d, 3H, J=6.3 Hz, iPr), 1.09 (d, 3H, J=6.9 Hz, iPr), 0.78 (d, 3H, J=6.9 Hz, iPr).

Catalyst K was prepared by adding MeLi (0.78 mL, 1.24 mmol) at −78° C. to a stirred solution of ligand L6 (0.544 g, 1.23 mmol) in Et$_2$O (20 mL) over a 5 min. period. After warming the resultant mixture up to ambient temperature and stirring for 4 hours, ZrCl$_4$ (142.0 mg, 0.610 mmol) at −78° C. was then added to the mixture over 15 minutes. The reaction mixture was then allowed to warm up to room temperature (25° C.) and stirred under argon overnight. After removal of the solvent by vacuum, the solids were slurried in methylene chloride and filtered. The filtrate was then concentrated to a saturated solution and the solids precipitated with hexane. The solids were filtered and washed with hexane. The complex was then dried by vacuum at room temperature. The complex obtained was a yellow/tan solid. Analysis of the resulting catalyst was as follows: $^1$H-NMR (300 MHz, CD$_2$Cl$_2$) δ: 8.07 (d, 1H, J=8.1 Hz, Ar), 7.84 (d, 2H, J=8.4 Hz, Ar), 7.67 (t, 1H, Ar), 7.54 (t, 1H, Ar), 7.24-7.16 (m, 2H, Ar), 7.09 (t, 4H, Ar), 6.87 (d, 2H, J=6.0 Hz, Ar), 3.40 (d, J=12.9 Hz, CH$_2$Ph), 3.29 (d, J=12.9 Hz, CH$_2$Ph).

Catalyst L was prepared by adding MeLi (0.92 mL, 0.1.46 mmol) at −30° C. to a stirred solution of ligand L1 (0.50 g, 1.46 mmol) in Et$_2$O (20 mL) over a 5 min. period. After warming the resultant mixture up to ambient temperature and stirring for 4 hours, a dark purple solution was obtained. In a separate flask, ZrCl$_4$ (169 mg, 0.72 mmol) was cooled to −78° C. and slurried in ether (20 mL). The lithium salt was then slowly added to the ZrCl$_4$ at −78° C. Immediately, the reaction mixture turned to an avocado green. The reaction mixture was then allowed to warm up to room temperature (25° C.) and stirred under argon overnight. After removal of the solvent by vacuum, the solids were slurried in methylene chloride and filtered. The solvent was then removed from the filtrate and the solids were dried by vacuum. The complex was obtained as a crystalline green solid. The analysis of the resulting catalyst was as follows: $^1$H-NMR (300 MHz, CD$_2$Cl$_2$) δ: 8.17-8.14 (m, Ar), 7.96 (d, 1H, J=8.4 Hz, Ar), 7.85-7.78 (m, Ar), 7.71-7.54 (m, Ar), 7.42-7.38 (m, Ar), 6.61 (d, 1H, J=7.2 Hz, Ar), 6.50 (d, 1H, J=7.2 Hz, Ar), 3.05-2.95 (CH$_2$Ph+CH, iPr), 2.87-2.79 (CH$_2$Ph+CH, iPr) 1.00 (d, 3H, J=6.9 Hz, iPr), 0.88 (d, 3H, J=6.9 Hz, iPr), 0.80 (d, 3H, J=6.9 Hz, iPr)

Catalyst M was prepared by dissolving the bisimine ligand L8 (55.1 mg, 110 □mol) and Hf(CH$_2$Ph)$_4$ (25.5 mg, 49.6 µmol) in C$_6$D$_6$ (3 mL) in a reaction tube at ambient temperature to form a reddish brown solution. The tube was covered with aluminum foil and left to stir at ambient temperature for 3 days. A dark brown solution was obtained.

Catalyst N was prepared as follows:

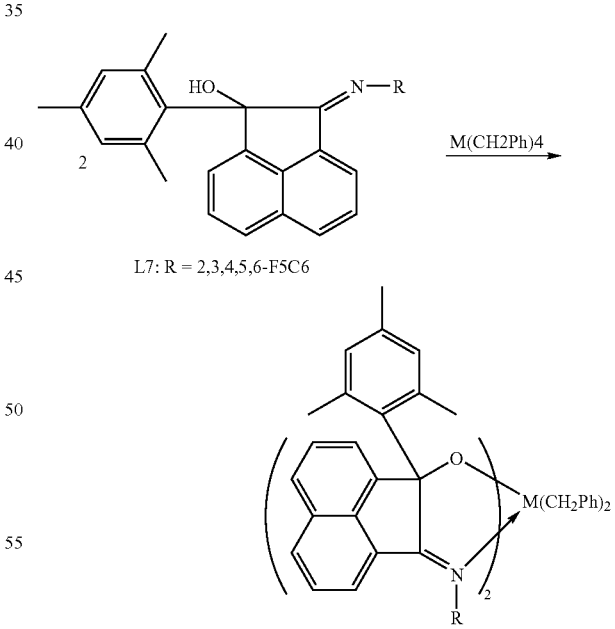

Supported Catalyst Preparation: The supported catalysts were prepared by mixing MAO/SiO$_2$ in toluene and then slowly adding a bidentate catalyst. The solids were stirred and allowed to settle. The supernatant was removed and the remaining solids were washed with hexane. The solids were then dried by vacuum. The supported catalyst was slurried in mineral oil.

Polymerizations under 1 atmosphere of ethylene pressure: Ethylene polymerizations were conducted in a 250 mL glass reactor at one-atmosphere at room temperature. A magnetic stirrer was added to the glass reactor and then it was capped with a rubber septum that contained a thermocouple. For each polymerization, 50 mL of toluene were added to the reactor. The toluene was saturated with ethylene monomer by continuously bubbling the ethylene gas through the toluene with a needle. For each polymerization, an aliquot of catalyst was activated with MMAO-3A. The catalyst solution was then injected into the 250 mL flask that contained 50 mL of toluene at ambient temperature (25° C.). After the desired amount of time, the reaction was quenched by the addition of a 10% solution of Methanol/HCl. The polymer was filtered, washed with methanol and left to dry at room temperature. Table 1 summarizes the polymerization results.

TABLE 1

| Run # | Catalyst (mg) | Polymerization time, min | Yield, g | Mw/1000 |
|---|---|---|---|---|
| 1 | A (6) | 90 | 0.05 | |
| 2 | B (5) | 15 | 3.90 | 12.2 |
| 3 | C (10) | 30 | 0.01 | |
| 4 | D (13) | 30 | 0.80 | |
| 5 | E (11) | 90 | 0.10 | |
| 6 | F (5) | 130 | 0.03 | |
| 7 | M (10) | 60 | 2.90 | 10.0 |
| 8 | N (5) | 30 | 1.60 | 5.2 |

Ethylene Polymerization under elevated pressures: Catalyst B was supported on MAO/SiO$_2$ with a catalyst loading of 4 wt.% and tested under elevated pressures of ethylene polymerization under different polymerization conditions. The polymerization of Run 9 was conducted at a temperature of 80° C. with hexane as the activator diluent. The polymerization of run 9 used at 2 ml. of TIBAL (0.250M in Hexane) as the activator. The molecular weights of the polyethylene produced in Runs 9 and 10 were not able to be determined because of the inability to filter for GPC analysis. The polymerization of Run 11 used 2 mL of MAO (30 wt.% in toluene) as the activator. Table 2 below summarizes the results.

TABLE 2

| Run # | Catalyst Type | Catalyst amount (mg) | Activator | Reaction Time (min.) | H2/C2 | Yield (gm) | Activity (g PE/g cat/h) | Mw | Mw/Mn |
|---|---|---|---|---|---|---|---|---|---|
| 9 | Supported | 150 | TIBAl | 60 | 0.25 | 34 | 227 | n.d. | n.d. |
| 10 | Supported | 217 | TIBAl | 60 | 0 | 56 | 258 | n.d. | n.d. |
| 11 | Not-Supported | 7 | MAO | 30 | 0 | 27 | 7,714 | 227,000 | 16.6 |

Propylene Polymerizations: The propylene polymerizations were conducted in 5 mL of toluene for the homogeneous polymerizations. The catalysts were activated with 0.2 mL of MAO (30 wt.% in toluene). The catalysts were used without isolation from the reaction mixture. The propylene polymerizations were conducted at 60° C. under 100 psig of propylene pressure in 5 mL of toluene (see, Table 3). The polymers were isolated immediately after quenching with acidic methanol. The Zr(CH$_2$Ph)$_4$ was used as a reference and Runs 12, 17 and 19 included a hexane insoluble fraction. Tables 3 and 4 summarize the results.

TABLE 3

| Run # | Catalyst | Polymerization Medium | Tm ° C. | Mw Distribution | Mw/1000 |
|---|---|---|---|---|---|
| 12 | B | Toluene | 145.7 | Trimodal | 808 (31%) |
| | | | | | 57 (48%) |
| | | | | | 7 (21%) |
| 13 | B | Bulk | 144.0 | | |
| 14 | G | Bulk | 139.7 | | |
| 15 | J | Toluene | 160.0 | | |
| 16 | L | Toluene | 153.0 | | |
| 17 | H | Toluene | 152.4 | | |
| 18 | C | Toluene | 152.2 | Trimodal | 394 (31%) |
| | | | | | 14 (48%) |
| | | | | | 15 (21%) |
| 19 | K | Toluene | 151.7 | | |
| 20 | N | Toluene | 160.4 | Bimodal | 360 (80%) |
| | | | | | 9 (20%) |
| 21 | N | Bulk | 159.0 | | |
| 22 | Zr(CH2Ph)4 (Comparison) | Toluene | N/A | N/A | |

As demonstrated by the examples above, the naphtho imino ligand based catalysts demonstrated greater activities than the tetrafluoro ligand based catalysts.

TABLE 4

| Run # | Catalyst | mmmm | mmmr | rmmr | mmrr | xmrx | mmrr | rrrr | rrrm | mrrm | % meso | % racemic | % error | def/1000 C. |
|---|---|---|---|---|---|---|---|---|---|---|---|---|---|---|
| 12 | B | 84.8 | 2 | 0.6 | 2.8 | 2.6 | 0.9 | 2.8 | 1.9 | 1.7 | 90.5 | 9.5 | 1.9 | 47.3 |
| 17 | H | 84.6 | 2.1 | 0.5 | 2.8 | 3.1 | 1.2 | 1.6 | 2.2 | 1.7 | 90.9 | 9.1 | 2.1 | 45.7 |
| 18 | C | 40.3 | 7.1 | 2.6 | 8.5 | 14.6 | 6.6 | 6.4 | 9.1 | 4.8 | 64.9 | 35.1 | 9.9 | 49.6 |
| 19 | K | 60.1 | 6.1 | 0.8 | 6.5 | 8.4 | 2.4 | 6.4 | 6.1 | 3.3 | 75.6 | 24.4 | 5 | 121.9 |
| 22 | Zr(CH$_2$Ph)$_4$ (Comparison) | 9.6 | 7.5 | 5.2 | 8.9 | 22.3 | 10.2 | 12.3 | 14.8 | 9.2 | 42.9 | 57.1 | 16.3 | 285.3 |

As demonstrated by the examples above, Catalyst B, H and K produced high crystallinity isotactic polypropylene.

What is claimed is:

1. A catalyst system comprising:
a compound having the general formula:

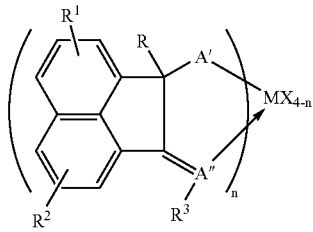

where R, $R^1$, $R^2$ and $R^3$ are optional and independently selected from the group consisting essentially of hydrogen, $C_1$ to $C_{20}$ alkyl groups or $C_6$ to $C_{20}$ aryl groups, A' and A" are independently selected from coordination groups, M is a Group 4 or 5 transition metal, X is selected from the group consisting essentially of a halogen, alkyl, aromatic group or combinations thereof and n is less than 4.

2. The catalyst system of claim 1, wherein $R^3$ is selected from the group consisting essentially of phenyl groups, naphthyl groups, $C_1$ to $C_{20}$ alkyl groups and cyclic groups and R is selected from the group consisting essentially of phenyl groups, alkyl groups, aliphatic groups, aromatic groups and benzyl groups.

3. The catalyst system of claim 1, wherein $R^3$ is selected from the group consisting essentially of phenyl groups, naphthyl groups and pentaflouro groups and R is selected from the group consisting essentially of benzyl groups, aromatic groups, alkyl groups, cyclic groups and hydrogen.

4. The catalyst system of claim 3, wherein n is 2, X is selected from the group consisting of chlorine and benzyl groups, $R^1$ is hydrogen, $R^2$ is hydrogen, A' is oxygen and A" is nitrogen.

5. The catalyst system of claim 1, wherein A' and A" are independently selected from the group consisting of oxygen, nitrogen, phosphorus and sulfur.

6. The catalyst system of claim 1, wherein A' is oxygen and A" is nitrogen.

7. The catalyst system of claim 1, wherein M is selected from the group consisting of zirconium, hafnium, titanium and vanadium.

8. The catalyst system of claim 1, wherein M is zirconium.

9. The catalyst system of claim 1, wherein X is selected from the group consisting essentially of benzyl groups and halogens.

10. The catalyst system of claim 1, wherein n is equal to 1.

11. The catalyst system of claim 1, wherein n is equal to 2.

* * * * *